Nov. 3, 1931.  G. D. GARDNER  1,830,199
ARTICHOKE TRIMMING MACHINE
Original Filed May 11, 1927   2 Sheets-Sheet 1

INVENTOR
GEORGE D. GARDNER
BY
ATTORNEY

Nov. 3, 1931.  G. D. GARDNER  1,830,199
ARTICHOKE TRIMMING MACHINE
Original Filed May 11, 1927  2 Sheets-Sheet 2

INVENTOR
GEORGE D. GARDNER
Lincoln Johnson
ATTORNEY

Patented Nov. 3, 1931

1,830,199

UNITED STATES PATENT OFFICE

GEORGE D. GARDNER, OF SAN JOSE, CALIFORNIA, ASSIGNOR, BY MESNE ASSIGNMENTS, TO BARRON GRAY PACKING COMPANY, OF SAN JOSE, CALIFORNIA, A CORPORATION OF CALIFORNIA

ARTICHOKE TRIMMING MACHINE

Application filed May 11, 1927, Serial No. 190,516. Renewed September 17, 1930.

This invention relates particularly to an apparatus for trimming, paring, pitting and coring the heart, core, or pit from fruit and vegetables.

An object of the invention is to provide an apparatus for automatically separating the heart, core or pit from the body of fruits and vegetables, and in particular for cutting the heart or core from artichokes.

A further object of the invention is to provide an apparatus for severing the heart, core, or pit from the body of fruits and vegetables, comprising an intermittent actuating means to deliver the fruit or vegetables to be worked upon below a cutter which is adapted to penetrate into and sever the heart, core or pit from the body of the object registering therewith, said cutting means being timed to work in unison with the intermittent means.

A still further object of the invention is to provide a fruit or vegetable coring machine having a rotary casing in registering alignment with the article to be cored, and a reciprocatable knife in said casing adapted to be concealed within the casing when an article to be cored is moved into registry with or removed from registry with the said casing, and to be projected from the rotary casing when the article to be cored is in registry therewith.

Other objects of the invention are to provide a fruit or vegetable coring, paring, trimming or pitting machine having an intermittent feeding means for advancing the article to be cored, trimmed, pared or pitted into registering engagement with a knife, timed to pare, trim, core or pit the said article at the moment of substantial registry with said knife; and to provide an apparatus such as will be hereinafter described, that will be superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the accompanying two sheets of drawings,

Fig. 6 is a fragmentary side elevation of a portion of Fig. 1 showing the cutting knife concealed within the rotatable casing.

Fig. 7 is a fragmentary view of the lift rod for actuating the cutting knife moving means.

Figure 1:
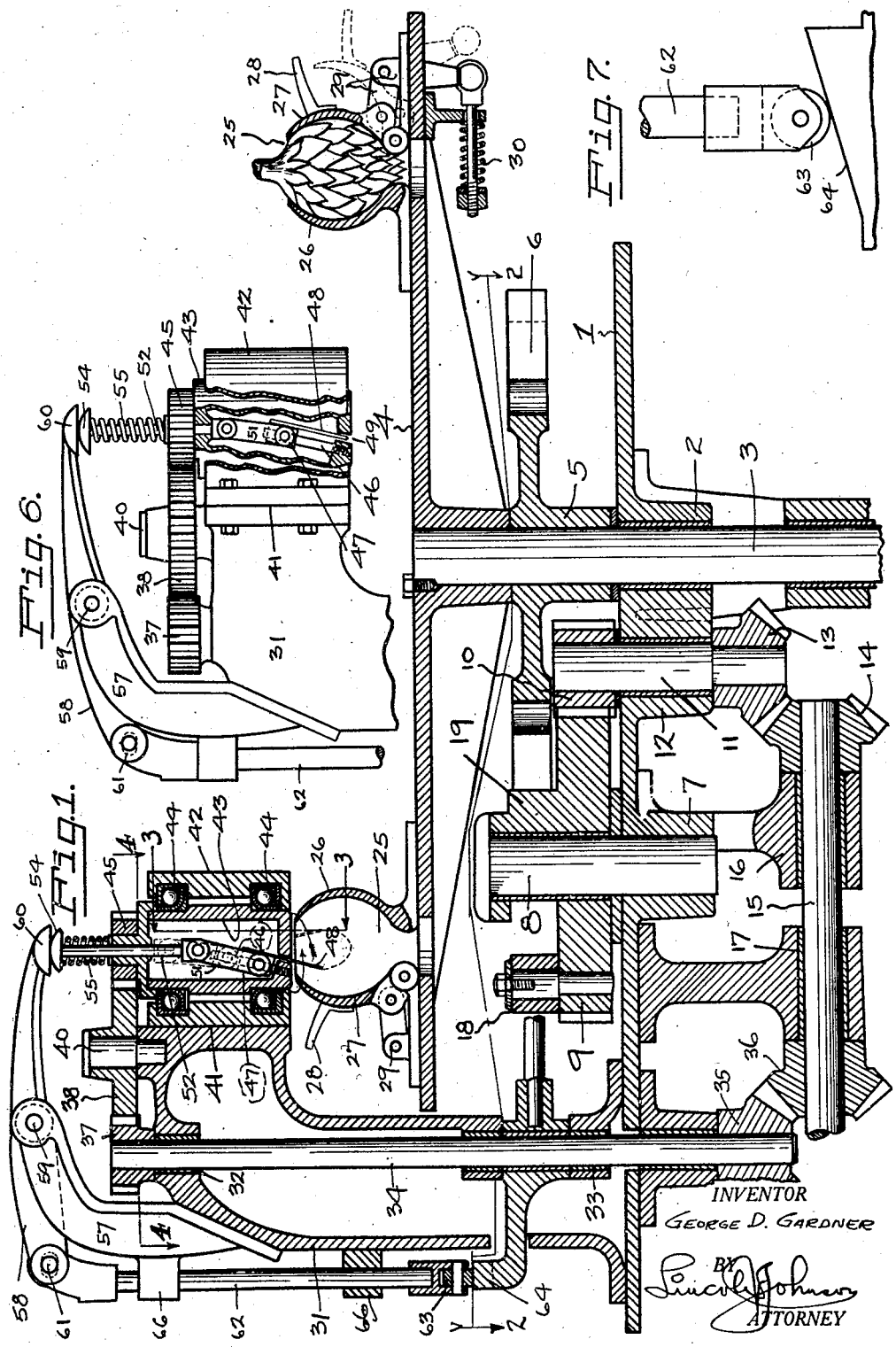
Fig. 1 represents a vertical cross section through a machine constructed in accordance with my invention for trimming the heart from an artichoke.

In detail, the construction illustrated in the drawings comprises a base 1 provided with a bearing 2 thereon, in which a shaft 3 is rotatably mounted, to rotate on a vertical axis. An end of the shaft 3 projects above the upper face of the base 1, and is provided with a circular table 4 fixedly mounted thereon. The table 4 is rotated or moved with a regular intermittent motion, by a driven or "Geneva" wheel 5 that is keyed to the shaft 3 between the bottom of the table 4 and the upper face of the base 1. The driven wheel 5 is provided with a plurality of radial slots 6 located around the periphery thereof.

A vertically disposed bearing 7 is provided on the upper face of the base 1, in which a stub shaft 8 is rotatably mounted. A driving gear 9 is keyed to the shaft 8 and said driving gear 9 meshes with a driving pinion 10 that is keyed to a shaft 11 journaled in the base 1. The lower end of the pinion shaft 11 is provided with a beveled gear 13 thereon that meshes with a companion beveled gear 14 fixed on a drive shaft 15 that is supported in bearings 16 and 17 arranged on the under side of the base 1. The shaft 15 is connected to a driving motor or driving pulley that is not shown.

The driving gear 9 is provided with a roller 18 that projects above the upper face thereof and said roller is adapted to engage one of the slots 6 in the driven wheel 5 each time it (said roller) makes a revolution, thus turning the driven "Geneva" wheel a portion of a revolution and consequently turning the table 4 a portion of a revolution. A circular boss 19 is provided on the upper face of the drive gear 9 and said boss is cut away at 20 to provide a clearance space for the projecting arms 21 on the driven "Geneva" wheel, which said arms 21 from the sides of adjacent slots 6 in the "Geneva" wheel. The concentric exterior of the boss 19 engages the concave surface 22 on the outer edge of each of the projecting arms 21, between each pair of slots 6, to prevent the driving roller 18 from becoming disengaged from the driven wheel 5, and which also prevents the latter from rotating while the roller is moving around to engage the next successive slot. The form of "Geneva" mechanism illustrated for imparting an intermittent rotary motion to the table 4 is a conventional one, and it would be clearly within the purview of the invention to substitute some other form of intermittent motion actuating means for moving the table 4.

The upper face of the table 4 is provided with a plurality of fruit or vegetable holders or grippers 25 mounted in spaced circumferential relation therearound. Each gripper 25 consists of complementary halves shaped to snugly engage the fruit or vegetable that is to be trimmed, cored, pared or pitted. One half 26 of each gripper 25 is fixed to the upper surface of the table 4, while the other half 27 of the gripper is pivotally mounted on the upper surface of the table 4 and is provided with a handle 28 thereon whereby the movable half of each gripper may be opened away from the stationary half of the gripper. An articulated link 29 is pivotally connected to the movable half 27 of the gripper 25, and is movably related to the table 4, said articulated link 29 having an expansion spring 30 mounted thereon to normally hold the movable half 26 of the gripper 25 in the closed position. In order to place an article, in each gripper to be pared, trimmed, cored or pitted, the operator presses on the handle 28 to open the movable half of the gripper against the tension of the spring 30, permitting the article to be inserted into the gripper. The operator then releases the opening pressure, and the spring 30 automatically restores the movable half of each gripper into engagement with the article to be worked upon and holds the said article in a relatively fixed position during the time that it is being cored trimmed, pared or pitted.

On one side of the base 1 I have provided a vertical standard 31 having suitable aligned bearings 32 and 33 therein in which a shaft 34 is rotatably mounted on a vertical axis in parallel alignment to the axis of the table shaft 3. The lower end of the standard shaft 34 is provided with a beveled gear 35 thereon that meshes with a companion beveled gear 36 arranged on the driving shaft 15. The upper end of the shaft 34 is provided with a pinion 37 thereon. The pinion 37 meshes with an idler gear 38 that is rotatably mounted on a shaft 40 journaled in the upper end of the standard 31. An end of the standard 31 is faced off, at 41, on a vertical plane that is parallel to the axis of the table shaft 3. A circular housing 42 is bolted onto the faced end of the standard 31 and the center axis of the housing 42 is adapted to register, approximately, with the center axis of each of the fruit or vegetable grippers 25. A casing 43 is rotatably mounted, on anti-friction bearings 44 located at each of its opposite ends, concentrically within the housing 42. The upper end of the casing 43 is provided with a spur gear 45 thereon that meshes with the idler gear 38. The casing 43 is thus driven by the spur gear 45 in the same direction of rotation as that of the shaft 34 in the standard 31.

A square guide shaft 46 is arranged within the interior of the casing 43, in a vertically and angularly inclined position. The shaft 46 is provided with a slide member 47 thereon, to one side of which a knife 48 is fixedly secured. The knife 48 is adapted to register with and lie in a slot 49 and is provided with a cutting edge 50 on one side thereof to cut in the direction of rotation of the casing 43. The guide shaft 46 is arranged on an inclined position within the casing 43, so that the slide member 47 with the knife 48 thereon lies in the same inclined or angularly disposed position, whereby the knife 48 as it rotates with the casing 43 prescribes a circular movement after it is projected from the casing 43 to thus cut a circular slot in any object into which it is penetrated.

The knife slide 47 is pivotally connected by a pair of links 51 to an end of a shaft 52 that is journaled concentrically within the casing 43. The shaft 52 extends above the upper end of the casing 43 and is provided with a head 54 on the end thereof. An expansion spring 55 is interposed between the under side of the head 54 and the upper end of the casing 43. The shaft 52 is arranged on the axis of rotation of the casing 43, while the knife slide 47 is arranged off of said true axis of rotation, and hence the links 51 connect the lower end of the shaft 52 and knife slide 47 in desirable relation, whereby the vertical reciprocating movement of the shaft 52 relative to the casing 43 causes the knife 48 to be projected from or drawn into the casing 43. The expansion spring 55 normally tends to keep the cutting knife 48 concealed within the rotary casing 43 and out of the path of travel of the grippers 25.

Figure 2:
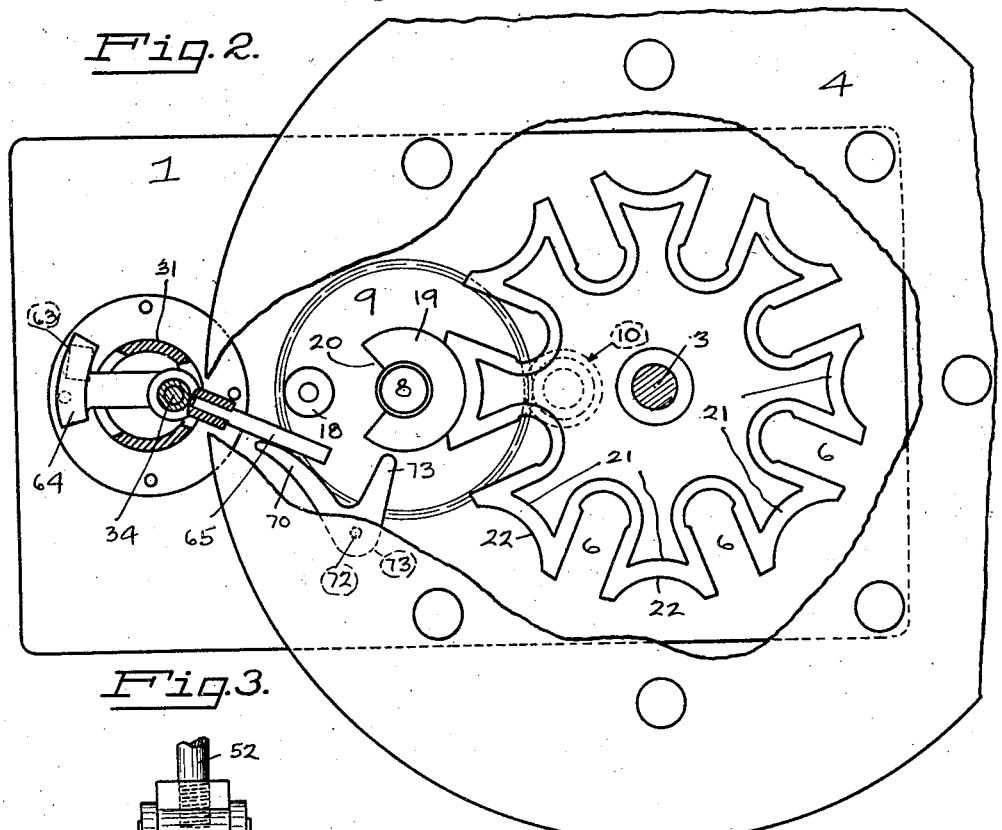
Fig. 2 is a plan view taken on the line 2—2 to Fig. 1.
Figure 3:
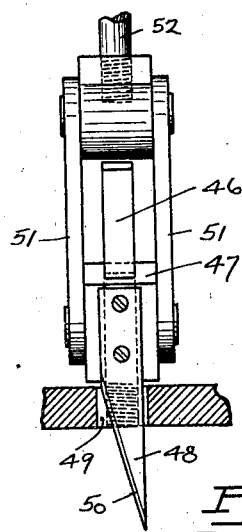
Fig. 3 is an enlarged side elevation taken through Fig. 1 on the line 3—3, to show the cutting knife.
Figure 4:
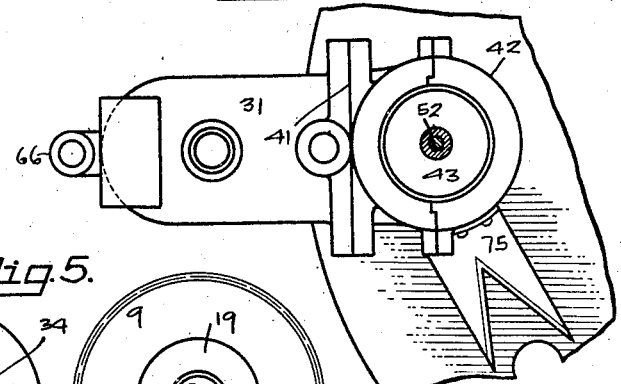
Fig. 4 is a plan view taken through Fig. 1 on the line 4—4.
Figure 5:
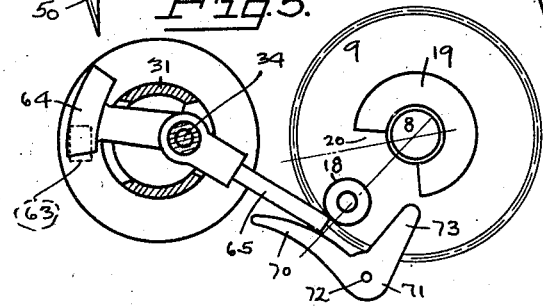
Fig. 5 is a plan view, similar to Fig. 2, showing the means for moving the cutting knives into and from the supporting casing.

In order to project the cutting blade 48 from the rotary casing 43 into the path of travel of the grippers 25, I provide a bracket 57 on the upper side of the standard 31, and to said bracket a walking beam 58 is pivoted at 59. One end 60 of the beam 58 engages the head 54 on the shaft 52 that controls the reciprocative or in and out movement of the knife 48. The opposite end of the beam 58 is pivotally connected at 61 to a lift rod 62 that is slidably mounted in bearings 66 provided on the exterior of the standard 31. The lower end of the lift rod 62 is provided with a roller 63 thereon and an inclined cam 64 engages the roller 63 on the lift rod 62. The cam 64 is pivotally mounted around the shaft 34, within the standard 31. The cam 64 is provided with an arm 65 thereon that is adapted to be engaged by the roller 18 on the drive gear 9. Thus as the drive gear 9 rotates, the roller 18 thereon is moved into contact with the arm 65 on the cam 64, and the said cam 64 is swung from the inoperative position shown in Fig. 2 to the operative position shown in Fig. 5. The swinging or arcuate movement of the cam 64 causes the inclined face of the cam 64 to be advanced under the roller 63 on the lift rod 62, and the said lift rod elevates the walking beam 58 which in turn lowers the shaft 52 into the casing 43 and causes the cutting blade 48 to be projected from the other end of said casing 43. The position of the cam in Fig. 2 positions the cutting knife in the concealed position shown in Fig. 6, and when the cam 64 is moved to the operative position shown in Fig. 5, the cutting knife is moved into the operative position shown in Fig. 1. The cam 64 is returned from the operative to the inoperative position by a leg 70 of a bell crank 71 that is pivoted to the base 1 at 72. The bell crank 71 is provided with a leg 73 thereon that lies in the path of movement of the roller 18. The roller 18 first engages the arm 65 on the cam to move the cam from the inoperative to the operative positions, and in the next movement the roller 18 engages the leg 73 of the bell crank 71 and causes the other leg of the bell crank 70 to engage the cam arm 65 to return the said cam from the operative to the inoperative position.

The casing 43 having the cutting knife therein is constantly rotating at a high rate of speed and the cutting knife is only projected from the enclosing casing throughout an arc of travel of about fifteen or twenty degrees of the roller 18, or the drive gear 9.

The cutting knife 48 is only adapted to be projected from the enclosing casing 43 into penetration with the fruit or vegetable to be trimmed, pared, cored or pitted during such time as the fruit or vegetable in the gripper is in registering alignment with the knife. The intermittent movement of the grippers 25 causes said grippers to be advanced step-by-step into registry with the cutting knife. During each intermittent stop movement a gripper is positioned under the cutting knife, and the cutting knife is forced down into the fruit or vegetable, prescribing a circular cut therein and severing a portion of the fruit or vegetable from the rest of the body so that it may easily be separated. After prescribing its circular cut, the knife automatically draws back into the casing 43, the severed fruit or vegetable passes on to be removed from its gripper and an uncut fruit or vegetable takes its place beneath the cutting member. The operation is thus carried on automatically.

I have provided a knife 75 on the side of the standard 31 to trim off an upper portion of the fruit or vegetable to be cored, etc., on a plane parallel to that of the table top 4 to permit the fruit or vegetable to pass closely beneath the lower face of the casing 43 to allow the cutting knife 48 to cut from the fruit or vegetable the most desirable or undesirable part thereof. The machine and apparatus is entirely automatic in its operation and the only manual labor involved is that of the human hands necessary to place the fruit, vegetables or other objects to be cored in the grippers. After the initial placement of the fruit or vegetables in the grippers, the same are automatically advanced in registry with the cutting knife, the cutting knife automatically enters the fruit or vegetable and withdraws therefrom to cut from the said fruit or vegetable the heart, core or pit thereof, in accordance with the material being worked upon.

Having thus described this invention, what I claim and desire to secure by Letters Patent is:

1. In combination a rotary casing; a coring member in said casing; holders for articles to be cored adapted to be arranged in juxtaposition to said coring member; an intermittent actuating means to maintain each article holder in and out of registry with the coring member; means operated in synchronism with the intermittent actuating means to project the coring member from the casing into each registering article holder and means to rotate the coring member while in the registering position, at a divergent angle to the axis of the holder and to withdraw the coring member back into the casing.

2. In combination, a frame; a plurality of holders on said frame to hold articles to be cored; means to move said holders, step by step, along a selected path of travel; a coring member arranged in juxtaposition to the path of travel of said holders; means synchronized with the step by step movement of the holders to reciprocate the coring member in relation to each holder and means to rotate the coring member when in the reciprocated position at a divergent angle to the axis of the holder.

3. A coring machine comprised of a rotary casing; means to rotate said casing; a straight knife reciprocatively mounted in said casing at an angle to the axis thereof to be projected from and drawn within said casing as it rotates; and means on the casing to reciprocate the knife relative to the casing.

4. A coring machine comprised of a rotary casing; means to rotate said casing; a guide shaft in said casing disposed at an angle to the axis thereof; a straight knife slidably mounted on said shaft to be moved in and out of and end of said casing concentric to the axis thereof; and a shaft reciprocatively mounted in said casing on the axis of said casing and related to said knife to slide said knife in and out of the casing.

5. A coring machine comprised of a rotary casing; means to rotate said casing; a guide shaft in said casing disposed at an angle to the axis thereof; a straight knife slidably mounted on said shaft to be moved in and out of an end of said casing concentric to the axis thereof; a shaft reciprocatively mounted in said casing on the axis of said casing; and links pivotally connected to the sliding knife and shaft to slide the knife in and out of the casing as the shaft is reciprocated.

6. A coring machine comprised of a rotary casing; means to rotate said casing; a straight knife reciprocatively mounted in said casing at an angle to the axis thereof to be projected from and drawn within said casing as it rotates; means on the casing to reciprocate the knife relative to the casing; holders for articles to be cored adapted to be arranged in registering communication with the coring knife; and an intermittent actuating means to advance the holders to and from communication with the coring knife synchronized with the knife reciprocating means to move the holders when the knife is within the casing and to project the knife from the casing when the holders are stationary said casing being adapted to rotate the coring knife around a registering axis of said article holder.

7. A coring machine comprised of a rotary casing; means to rotate said casing; a guide shaft in said casing disposed at an angle to the axis thereof; a straight knife slidably mounted on said shaft to be moved in and out of an end of said casing concentric to the axis thereof; a shaft reciprocatively mounted in said casing on the axis of said casing and related to said knife to slide said knife in and out of the casing; holders for articles to be cored adapted to be arranged in registering communication with the coring knife; and an intermittent actuating means to advance the holders to and from communication with the coring knife synchronized with the knife reciprocating means to move the holders when the knife is within the casing and to project the knife from the casing when the holders are stationary said casing being adapted to rotate the coring knife around a registering axis of said article holder.

8. A coring machine comprised of a rotary casing; means to rotate said casing; a guide shaft in said casing disposed at an angle to the axis thereof; a straight knife slidably mounted on said shaft to be moved in and out of an end of said casing concentric to the axis thereof; a shaft reciprocatively mounted in said casing on the axis of said casing; links pivotally connected to the sliding knife and shaft to slide the knife in and out of the casing as the shaft is reciprocated; holders for articles to be cored adapted to be arranged in registering communication with the coring knife; and an intermittent actuating means to advance the holders to and from communication with the coring knife synchronized with the knife reciprocating means to move the holders when the knife is within the casing and to project the knife from the casing when the holders are stationary said casing being adapted to rotate the coring knife around a registering axis of said article holder.

9. A coring machine comprised of an article holder; a coring member comprised of a straight blade; means to advance the article holder into and out of registry with the coring member; means to insert and withdraw the coring member into and from the article holder, when said holder is in registry therewith so that the coring blade is inclined away from the vertical axis of the holder; and means to rotate the coring member to traverse a circular orbit within the holder.

10. A coring machine comprising a rotary casing, means to rotate said casing, a knife reciprocably mounted in said casing at an angle to the axis thereof to be projected from and drawn within said casing as it rotates, and means to reciprocate the knife relative to the casing and in a plane parallel to the angle at which it is disposed.

11. A coring machine comprising means for holding an object to be cored, a knife supported adjacent said means at an angle to the axis of the core of the object held thereby and pointing outwardly therefrom means for causing said knife to move in a rotary path around a center coaxial with the core, and means for reciprocating the knife in the direction of said angle, whereby the knife will be caused to enter the object and impart a frusto conical cut to the object about its core.

12. A coring machine comprising a holder for an object to be cored, a casing rotatable about an axis coaxial with the core of the object in said holder, a straight reciprocable knife carried by the casing, said casing having a guideway for said knife formed at an angle to its axis of rotation, means for advancing the knife through said guideway whereby it will enter the object at an angle to the core thereof, and means for rotating the knife while it is in the object to impart a frusto-conical cut around the core.

13. A coring machine comprising a knife, means for rotating said knife about a central axis, said knife being disposed at an angle to said axis, and means for reciprocating said knife rectilinearly.

In testimony whereof, I have hereunto set my hand at San Francisco, California, this 15th day of April, 1927.

GEORGE D. GARDNER.